United States Patent [19]
Zatta et al.

[11] Patent Number: 5,908,823
[45] Date of Patent: Jun. 1, 1999

[54] MICROPOROUS CRYSTALLINE MATERIAL, A PROCESS FOR ITS PREPARATION AND ITS USE IN DETERGENT COMPOSITIONS

[75] Inventors: Agostino Zatta, Sesto Ulteriano; Pier Domenico Mattioli, Saronno; Maria Roberta Rabaioli, Cerro Maggiore; Pierino Radici, Turate; Rosario Aiello, Reude; Fortunato Crea, Castrolibero, all of Italy

[73] Assignee: Condea Augusta S.p.A., Palermo, Italy

[21] Appl. No.: 08/882,997

[22] Filed: Jun. 26, 1997

[30] Foreign Application Priority Data

Jun. 27, 1996 [IT] Italy .................................. MI96A1311

[51] Int. Cl.⁶ ............................... C11D 7/20; C11D 3/12; C11D 9/18; C01B 39/20
[52] U.S. Cl. .......................... 510/507; 423/700; 423/710; 423/DIG. 21; 423/DIG. 24; 510/220; 510/276; 510/315; 510/323; 510/377; 510/532
[58] Field of Search ..................................... 423/700, 710, 423/DIG. 21, DIG. 24; 510/507, 532, 220, 276, 315, 323, 377; 252/FOR 246

[56] References Cited

U.S. PATENT DOCUMENTS

| | | | |
|---|---|---|---|
| 3,366,578 | 1/1968 | Michalko | 502/8 |
| 4,235,856 | 11/1980 | Kostinko | 423/712 |
| 4,366,720 | 11/1994 | Caglione et al. | 423/713 |
| 4,406,822 | 9/1983 | Sanders et al. | 502/67 |
| 4,603,040 | 7/1986 | Kuznicki et al. | 423/712 |
| 4,606,899 | 8/1986 | Butter et al. | 423/709 |
| 4,661,334 | 4/1987 | Latourrette et al. | 423/710 |
| 5,487,882 | 1/1996 | Hu et al. | 423/700 |

FOREIGN PATENT DOCUMENTS

| | | |
|---|---|---|
| 0 196 078 | 10/1986 | European Pat. Off. . |
| 1 265 727 | 4/1968 | Germany . |
| 1767 001 | 7/1971 | Germany . |
| 2127 754 | 12/1971 | Germany . |
| 26 05 113 | 8/1977 | Germany . |
| 27 31 010 | 1/1978 | Germany . |
| 1 232 429 | 5/1971 | United Kingdom . |

*Primary Examiner*—Ardith Hertzog
*Attorney, Agent, or Firm*—Oblon, Spivak, McClelland, Maier & Neustadt, P.C.

[57] ABSTRACT

A microporous crystalline material named zeolite A-LSX having, in its anhydrous form, an oxides molar composition corresponding to formula (I):

$$(M_{2/n}O + M'_{2/n}O) \cdot Al_2O_3 \cdot zSiO_2 \qquad (I)$$

in which:

M and M', identical or different, represent a cation of an alkali or alkaline earth metal of valency n;

z is a number between 2.1 and 2.6, extremes included.

Said microporous crystalline material can be used as a builder in detergent systems.

29 Claims, No Drawings

MICROPOROUS CRYSTALLINE MATERIAL, A PROCESS FOR ITS PREPARATION AND ITS USE IN DETERGENT COMPOSITIONS

This invention relates to a microporous crystalline material.

More particularly the invention relates to a microporous crystalline material, hereinafter named zeolite A-LSX (Low Silica X), and a process for its preparation.

The invention further relates to the use of said material as a builder in detergent systems.

The invention also relates to detergent compositions containing said zeolite A-LSX.

Zeolites, both of natural and synthetic origin, are alumino-silicates of porous crystalline nature formed from a three-dimensional framework of $TO_4$ tetrahedra, where T can be silicon or aluminium. The presence of aluminium in tetrahedral coordination in the crystalline lattice determines excess negative charge which is balanced by alkali metal ions (Na, K, Rb, Li or Cs), alkaline earth ions (Mg or Ca), or ammonium ions.

It is known to use zeolite A as a builder in detergent systems, such as described, for example, in U.S. Pat. No. 4,649,036, for removing from wash water the polyvalent metal ions, in particular calcium ions, which constitute most of the hardness in water. However zeolite A does not appreciably reduce the hardness due to magnesium ion presence because of its insufficient pore size in relation to the radius of this ion in aqueous solution at initial contact temperature during washing with mains water.

In this respect, at room temperature, before the action of the wash system comprising, for example, surfactants, bleaching agents, carbonates etc. acts, the magnesium ion exchange kinetics are very slow and consequently the capacity of zeolite A to remove magnesium ions is insufficient in practice, to the extent of requiring adjuvant additives.

It is also necessary to virtually completely remove the ions, such as calcium and magnesium, as quickly as possible from the wash system to improve its effect and to eliminate the formation of residual incrustation on the fabric. In this respect, if said ions are not removed, the soluble calcium and magnesium salts normally present in water give rise, due to the presence of other components of the detergent composition as, for example, sodium carbonate, to the formation of precipitates of mixed calcium and magnesium carbonates and carbonate-hydrates.

Moreover, the formation of poorly soluble salts of these ions, especially in detergent compositions containing anionic surfactants, reduces the active quantity of these components available for the wash itself. To this must be added the fact that, as already stated, these give rise to deposits on fabrics, resulting in possible damage to their fibres.

Another zeolite known in detergency is zeolite X described, for example, in German patent DD 43,221, which has a pore opening sufficiently large to provide a sufficiently high ion exchange rate, in particular of the magnesium ion. However, the Si/Al ratio which, in contrast to that of zeolite A, always well exceeds 1, results in a reduction in overall ion exchange capacity. Furthermore, in zeolite A all the sites are accessible to ion exchange (uniform pore system with an average pore diameter of 4.2 Å), in the zeolite X lattice there are regions less accessible to ion exchange (non-uniform pore system: regions with pores of an average diameter 7.4 Å and regions with pores of an average diameter 2.2 Å). Faced with this situation a zeolite with an Si/Al ratio of between 0.9 and 1.1, similar to that of zeolite A, has been designed and identified as zeolite LSX (Low Silica X), presenting the advantages of ion exchange capacity close to that of zeolite A because of the Si/Al ratio, together with an ion exchange rate typical of zeolite X because of its structure. Said zeolite LSX is described, for example, in GB 1,580,928.

However the known methods for preparing this zeolite LSX are extremely costly to the detriment of economically acceptable and commercially valid industrial production. In this respect, its preparation requires an excessively lengthy production time and in particular aging time of between 15 and 100 hours at a temperature less than 50° C. In addition, the need to operate at a high $K_2O/(K_2O+Na_2O)$ ratio of between 0.10 and 0.40, introduces a further negative element in that, if potassium is present in the final zeolite, this latter requires purification to achieve the desired ions —exchange capacity and rate, and the characteristics required for a product suitable for use in the detergent field. The present applicant has now surprisingly found a simpler and less costly process able to overcome the aforedescribed problems which enables a new microporous crystalline material to be obtained, hereinafter known as zeolite A-LSX (Low Silica X). Said zeolite is characterised by a structure representing the advantages both of zeolites of type A and of zeolites of type X. Moreover, said zeolite is particularly suitable for use in the detergent field in that it provides a high capacity for and rate of removal of the calcium and magnesium ions present in water at normal wash temperature.

It is also worth noting that the zeolite A-LSX of the present invention provides a calcium and magnesium ion exchange capacity and rate decidedly greater than those obtainable by simply physically mixing zeolite A with zeolite X. Furthermore, in the zeolite A-LSX of the present invention, a zeolite LSX percentage of the order of 20%–30% is sufficient to achieve the required performance objectives in terms of calcium and magnesium ions exchange capacity and rate. However, if necessary, the zeolite LSX percentage can reach 90%.

The present invention therefore provides a microporous crystalline material named zeolite A-LSX having, in its anhydrous form, an oxides molar composition corresponding to formula (I):

$$(M_{2/n}O+M'_{2/n}O).Al_2O_3.zSiO_2 \qquad (I)$$

in which:

M and M', identical or different, represent a cation of an alkali or alkaline earth metal of valency n;

z is a number between 2.1 and 2.6, extremes included.

Preferably M and M', different from each other, represent an alkali metal, more preferably sodium and potassium respectively.

The zeolite A-LSX of the present invention is obtained by a process comprising:

a) preparing two aqueous solutions containing respectively:

$Al_2O_3$ and $M_{2/n}O$ or $Al_2O_3$ and a mixture of $M_{2/n}O+M'_{2/n}O$ $SiO_2$ and $M_{2/n}O$ or $SiO_2$ and a mixture of $M_{2/n}O+M'_{2/n}O$;

in which the quantity of reactants is such as to satisfy the following molar ratios:

$SiO_2/Al_2O_3$ from 2.30 to 2.60, extremes included, preferably from 2.40 to 2.55, extremes included;

$(M_{2/n}O+M'_{2/n}O)/SiO_2$ from 2.40 to 1.20, extremes included, preferably from 1.70 to 1.25, extremes included;

$M_{2/n}O/(M_{2/n}O+M'_{2/n}O)$ from 0.91 to 1.00, extremes included, preferably from 0.94 to 0.96, extremes included;

$H_2O/(M_{2/n}O+M'_{2/n}O)$ from 20 to 40, extremes included, preferably from 22 to 33, extremes included;

b) bringing the two mixtures prepared in stage a) into contact at a temperature of between 20° C. and 70° C. for a time of between 1 minute and 30 minutes;

c) aging the mixture obtained in stage b) at a temperature of between 60° C. and 70° C. for a time of between 30 minutes and 15 hours, preferably between 2 hours and 8 hours;

d) crystallizing the mixture obtained in stage c) at a temperature of between 90° C. and 100° C. for a time of between 10 minutes and 120 minutes, preferably between 30 minutes and 60 minutes.

Stage a) of the aforedescribed process is conducted at a temperature of between 20° C. and 220° C.: the temperature used depending on the starting material.

The source of the aluminium used in stage a) of the process of the present invention is a sodium aluminate solution or a sodium and potassium aluminate solution.

The source of the silica used in stage a) of the process of the present invention is a sodium silicate solution or a sodium and potassium silicate solution, in which the $SiO_2/Na_2O$ or $SiO_2/(Na_2O+K_2O)$ ratio is a whole or fractional number between 1 and 3, extremes included.

The source of the cations used in stage a) of the process of the present invention is sodium hydroxide or a mixture of sodium and potassium hydroxides.

According to a preferred embodiment of the process of the present invention, M represents sodium and M' represents potassium, the reactants being mixed in stage b) at room temperature by adding together the aqueous solutions prepared in stage a) under agitation over a heel of water.

During the aging stage c) the mass is left to stand, preferably without agitation. Even if mixture agitation is not a critical operative parameter, depending also on the synthesis apparatus, it is however preferable to conduct said aging stage c) under static conditions and the crystallization stage d) under static conditions or under agitation (agitation being conducted with the common devices known to the expert of the art).

According to another manner of implementing the process of the present invention, M represents sodium and M' represents potassium, the reaction mixture of stage b) being formed by adding under agitation to the sodium aluminate solution or sodium and potassium aluminate solution prepared in stage a), the sodium silicate solution or sodium and potassium silicate solution prepared in stage a), at a temperature such as to obtain an average resultant temperature between 60° C. and 70° C., the subsequent stages c) and d) being conducted under the aforedescribed conditions.

On termination of the crystallization stage d), the solid crystalline product is separated from the mother mixture by conventional methods such as filtration, washed with demineralized water and dried. This drying is conveniently conducted at a temperature of up to about 170° C. and preferably of the order of 90° C.–120° C., for a time sufficient to completely or substantially completely eliminate the imbibition water.

The preferred final product has the following composition in terms of moles of oxide:

$Na_2O$ from 0.9 to 0.99, extremes included;
$K_2O$ from 0.1 to 0.01, extremes included;
$Al_2O_3$ 1.00;
$SiO_2$ from 2.10 to 2.30, extremes included; and a crystalline $H_2O$ content of between 21% and 24%, extremes included.

The zeolite A-LSX of the present invention has an average particle diameter of between 0.9 $\mu$m and 10 $\mu$m, extremes included, preferably between 1.5 $\mu$m and 5 $\mu$m, extremes included.

The present invention also relates to the use of said zeolite A-LSX as a builder in detergent systems.

The present invention also relates to the detergent compositions containing the aforedescribed zeolite A-LSX.

The zeolite A-LSX can be incorporated in detergent compositions of any physical form, such as powders, liquids, gels and solid bars.

The already known formulation principles for using zeolite 4A in detergent compositions can be generally used.

The zeolite A-LSX of the present invention can be used as a builder either alone or together with other commonly used builders. Said zeolite can replace zeolite A and zeolite LSX in the detergent compositions used for normal applications. Two classes of detergent compositions in which the zeolite of the present invention is particularly useful are fabric wash detergents and dishwasher detergents.

The total builder quantity present in the detergent compositions is usually between 20 wt % and 80 wt %, which quantity can consist totally or partially of the zeolite A-LSX of the present invention. If desired, zeolite A-LSX can be used in combination with other aluminosilicates such as zeolite A. The quantity of zeolite A-LSX present in the detergent compositions of the present invention is preferably between 20 wt % and 50 wt %.

Other builders which can be present include for example polymer polycarboxylates such as polyacrylates, acrylic-maleic copolymers, acrylic phosphinates; monomer polycarboxylates such as nitrotriacetates and ethylenediaminotetraacetates; inorganic salts such as sodium carbonate; and many other commonly used compounds known to the expert of the art.

The zeolite A-LSX of the present invention is useful, particularly, in detergent compositions which do not contain, or contain only a small quantity of, builders containing inorganic phosphate such as sodium tripolyphosphate, sodium orthophosphate or sodium pyrophosphate.

The detergent compositions, further object of the present invention, can also contain, as essential components, one or more surfactants, which can be chosen from anionic, cationic, nonionic, amphoteric or zwitterionic surfactants containing or not containing soap, or their mixtures. Many surfactants usable for the purpose are available commercially and are described in the literature, for example in "Surface-Active Agents and Detergents", Vol I and II, by Schwartz, Perry and Berch.

Preferred surfactants are soap-containing anionic and nonionic surfactants, and synthetic anionic and nonionic surfactants not containing soap.

Anionic surfactants are well known in the art. Examples of these are alkylbenzene sulphonates, in particular sodium alkylbenzene sulphonates having a $C_8$–$C_{15}$ alkyl chain; primary and secondary alkyl sulphates, in particular sodium sulphates of a $C_{12}$–$C_{15}$ primary alcohol; olefin sulphonates; alkane sulphonates; dialkyl sulphosuccinates; sulphonated fatty acid esters.

Usable nonionic surfactants are ethoxylated primary and secondary alcohols, in particular ethoxylated $C_{11}$–$C_{18}$ primary and secondary alcohols containing from 1 to 20 moles of ethylene oxide per mole of alcohol; and alkylpolyglucosides.

The choice of surfactant and the quantity present depend on the final use of the detergent composition. For example, for dishwasher detergents it is preferable to use a small quantity of nonionic surfactant of low foaming capacity. In the case of detergent compositions for fabric washing, different surfactants can be used, as is well known to the expert of the art, depending on the final use of said detergent compositions, ie hand or machine washing.

The total quantity of surfactant present in the detergent compositions obviously depends on their final use and can be low, such as 0.5 wt % in detergent compositions for example for dishwashers, or high, such as 60 wt % in detergent compositions for example for hand-washing fabrics. Generally, in the case of detergent compositions for fabric washing, a surfactant quantity of between 5% and 40% is used.

A preferred type of detergent composition for machine-washing fabrics contains anionic surfactants and nonionic surfactants in a weight ratio of at least 0.67:1, preferably 1:1, and more preferably between 1:1 and 10:1.

The detergent compositions of the present invention can also contain bleaching agents. Dishwasher detergent compositions can contain chlorine as bleaching agent, whereas fabric wash detergent compositions can contain peroxides as bleaching agents, such as, for example, inorganic persalts or organic peroxyacids, which can be used together with activators which improve the bleaching action at low wash temperature. Again, the expert of the art will have no difficulty in choosing the most suitable bleaching agent.

Other components which can be present in the detergent compositions of the present invention are sodium silicate, fluorescent agents, anti-redeposition agents, inorganic salts such as sodium sulphate, enzymes, foam control agents or foaming agents (according to the particular case), pigments and perfumes. This list is in no way exhaustive.

The detergent compositions of the present invention can be prepared by the various methods known in the art. For example, detergents in powder form can be prepared by spray-drying a slurry of heat-insensitive compatible components followed by spraying-on or after-dosing those ingredients which cannot be used in the slurry process. The expert of the art will have no difficulty in deciding which components can be included in the slurry and which must be after-dosed or sprayed-on. The zeolite A-LSX of the present invention can generally be included in the slurry, although other incorporation methods can obviously be used such as, for example, compounding the dry powders.

Zeolite A-LSX of the present invention with small-dimension particles is particularly useful in liquid detergent compositions. Said compositions and methods for preparing them are well known to the expert of the art.

For a better understanding of the present invention and its implementation, some illustrative examples are given hereinafter which are in no way to be considered as restrictive of the scope of the invention.

EXAMPLE 1

A heel of demineralized water (1300 parts) is fed at room temperature (about 20° C.) into a steel reactor of 3 liters capacity, fitted with an agitator, thermometer and an oil circulation jacket connected to a temperature-controlled bath. By means of two dropping funnels, the following solutions are fed in simultaneously under agitation over about 30 minutes:

sodium silicate (700 parts) of 13% $SiO_2$ and 6.5% $Na_2O$, at a temperature of about 20° C.;

sodium aluminate (1000 parts) of 6.2% $Al_2O_3$ and 16.3% $Na_2O$, and containing 27.5 parts of $K_2O$, at a temperature of about 20° C.

A gel mass is obtained and is heated, under agitation, by circulating oil through the jacket at a temperature of 70° C. On reaching 70° C., agitation is halted and said temperature is maintained for 12 hours.

After this aging time, agitation is recommenced and the mass heated to about 96° C., maintaining it under agitation at said temperature for 2 hours, until complete crystallization is achieved.

The crystals are filtered off under vacuum, washed with demineralized water, dried in an oven at 100° C. for 4 hours, and left to stabilize in air.

A zeolite A-LSX is obtained, the physical characteristics of which are reported in Table 1.

EXAMPLE 2

A heel of demineralized water (400 parts) is fed at room temperature (about 20° C.) into a steel reactor of 2 liters capacity, fitted with an agitator, thermometer and an oil circulation jacket connected to a temperature-controlled bath.

By means of two dropping funnels, the following solutions are fed in simultaneously under agitation over about 30 minutes:

sodium silicate (500 parts) of 26.7% $SiO_2$ and 13.35% $Na_2O$, at a temperature of about 20° C.;

sodium aluminate (1100 parts) of 8.9% $Al_2O_3$ and 13.7% $Na_2O$, and containing 14.1 parts of $K_2O$, at a temperature of about 20° C.

A gel mass is obtained and is heated, under agitation, by circulating oil through the jacket at a temperature of 70° C. On reaching 70° C., agitation is halted and said temperature is maintained for 6 hours.

After this aging time, agitation is recommenced and the mass heated to about 96° C., maintaining it under agitation at said temperature for 2 hours, until complete crystallization is achieved.

The crystals are filtered off under vacuum, washed with demineralized water, dried in an oven at 100° C. for 4 hours, and left to stabilize in air.

A zeolite A-LSX is obtained, the physical characteristics of which are reported in Table 1.

EXAMPLE 3

The following solution is fed into a steel reactor of 2 liters capacity, fitted with an agitator, thermometer and an oil circulation jacket connected to a temperature-controlled bath:

sodium aluminate (1525 parts) of 6.0% $Al_2O_3$ and 6.72% $Na_2O$, and containing 14.15 parts of $K_2O$, at a temperature of about 65° C.

By means of a dropping funnel, the following solution is fed in over a period of about 5 minutes:

sodium silicate (475 parts) of 28.4% $SiO_2$ and 14.2% $Na_2O$, at a temperature of about 65° C.

A gel mass is obtained and is maintained at 65° C. under agitation for 30 minutes. The agitation is halted and the mass left standing at 65° C.–67° C. for 12 hours.

After this aging time, agitation is recommenced and the mass heated to about 96° C., maintaining it under agitation at said temperature for 2 hours, until complete crystallization is achieved.

The crystals are filtered off under vacuum, washed with demineralized water, dried in an oven at 100° C. for 4 hours, and left to stabilize in air.

A zeolite A-LSX is obtained, the physical characteristics of which are reported in Table 1.

EXAMPLE 4

The following solution is fed into a steel reactor of 2 liters capacity, fitted with an agitator, thermometer and an oil circulation jacket connected to a temperature-controlled bath:

sodium aluminate (1512 parts) of 6.8% $Al_2O_3$ and 7.94% $Na_2O$, and containing 15.1 parts of $K_2O$, at a temperature of about 65° C.

By means of a dropping funnel, the following solution is then fed in over a period of about 5 minutes:

sodium silicate (488 parts) of 28.4% $SiO_2$ and 14.2% $Na_2O$, at a temperature of about 65° C.

A gel mass is obtained and is maintained at 65° C. under agitation for 30 minutes. The agitation is halted and the mass left standing at 65° C.–67° C. for 5 hours.

After this aging time, agitation is recommenced and the mass heated to about 90–92° C., this temperature being maintained for 2 hours, until complete crystallization is achieved.

The crystals are filtered off under vacuum, washed with demineralized water, dried in an oven at 100° C. for 4 hours, and left to stabilize in air.

A zeolite A-LSX is obtained, the physical characteristics of which are reported in Table 1.

TABLE 1

| PHYSICAL CHARACTERISTICS | EXAMPLE No. | | | |
|---|---|---|---|---|
| | 1 | 2 | 3 | 4 |
| Ratio zeolite A/LSX | 40/60 | 75/25 | 20/80 | 80/20 |
| Surface area (m$^2$/g) | 229 | 130 | 426 | 103 |
| Particle average diameter ($\mu$) | 5.0 | 3.5 | 4.0 | 3.7 |
| Water content (%) | 23.3 | 21.9 | 23.3 | 21.5 |

EXAMPLE 5

Calcium Ion Exchange

The calcium ion exchange rate and capacity were measured using an apparatus with a specific ion electrode in a standard system.

For this purpose, 1 liter of an aqueous solution containing calcium chloride to the extent of 3.135 mmoles of calcium and 20 cc of a pH 10.2 buffer solution is agitated and maintained at a constant temperature of 22° C. After immersing the previously stabilized and calibrated electrode specific for calcium, a zeolite sample is introduced (the zeolites used are indicated in the following Tables 2–4), corresponding to 1 g of anhydrous product.

The decrease in the calcium ion quantity in the solution is measured and recorded continuously, to hence obtain the kinetics of the ion exchange performed by the zeolite. The data obtained are reported in Table 2.

TABLE 2

| $Ca^{2+}$ ION EXCHANGE KINETICS AT 24° C. | | | | | | |
|---|---|---|---|---|---|---|
| mg CaO per g zeolite | | | | | | |
| TIME (sec) | A (1) | X (2) | A-LSX (3) | A-LSX (4) | MIX 75 (5) | MIX 80 (6) |
| 20 | 37 | 68 | 65 | 91 | 46 | 62 |
| 30 | 55 | 71 | 72 | 93 | 60 | 68 |
| 60 | 73 | 75 | 85 | 96 | 74 | 75 |

TABLE 2-continued

| $Ca^{2+}$ ION EXCHANGE KINETICS AT 24° C. | | | | | | |
|---|---|---|---|---|---|---|
| mg CaO per g zeolite | | | | | | |
| TIME (sec) | A (1) | X (2) | A-LSX (3) | A-LSX (4) | MIX 75 (5) | MIX 80 (6) |
| 90 | 83 | 78 | 91 | 98 | 82 | 79 |
| 120 | 91 | 81 | 96 | 100 | 84 | 83 |

(1): Zeolite A;
(2): Zeolite X (Si/Al ratio 1.24);
(3): Zeolite A-LSX; A/LSX ratio 75/25 by XRD analysis (zeolite of Example 2);
(4): Zeolite A-LSX; A/LSX ratio 20/80 by XRD analysis (zeolite of Example 3);
(5): Mix 75 - physical mixture of zeolite A and zeolite X in 75/25 ratio;
(6): Mix 80 - physical mixture of zeolite A and zeolite X in 20/80 ratio.

EXAMPLE 6

Calcium Ion Exchange

Using the apparatus described in Example 5 and operating under the same conditions, the calcium ion exchange kinetics are measured in the same aqueous system with sodium chloride added to achieve a concentration thereof of 0.01 moles/l.

All other chemical species have the same concentration. The data obtained are reported in Table 3.

TABLE 3

| $Ca^{2+}$ ION EXCHANGE KINETICS AT 24° C. | | | | | | |
|---|---|---|---|---|---|---|
| mg CaO per g zeolite | | | | | NaCl 0.01 moles/l | |
| TIME (sec) | A (1) | X (2) | A-LSX (3) | A-LSX (4) | MIX 75 (5) | MIX 80 (6) |
| 30 | 48 | 70 | 66 | 85 | 55 | 66 |
| 60 | 57 | 82 | 78 | 92 | 65 | 77 |
| 90 | 80 | 85 | 84 | 94 | 82 | 84 |
| 120 | 87 | 88 | 87 | 97 | 87 | 88 |
| 600 | 118 | 98 | 104 | 104 | 112 | 102 |

(1): Zeolite A;
(2): Zeolite X (Si/Al ratio 1.24);
(3): Zeolite A-LSX; A/LSX ratio 75/25 by XRD analysis (zeolite of Example 2);
(4): Zeolite A-LSX; A/LSX ratio 20/80 by XRD analysis (zeolite of Example 3);
(5): Mix 75 - physical mixture of zeolite A and zeolite X in 75/25 ratio;
(6): Mix 80 - physical mixture of zeolite A and zeolite X in 20/80 ratio.

EXAMPLE 7

Magnesium Ion Exchange

Using the apparatus described in Example 5 modified for the use of an electrode specific for the magnesium ion and operating under the same conditions, the magnesium ion exchange kinetics are measured in the same aqueous system.

For this purpose, 1 liter of a solution containing magnesium chloride to the extent of 3.135 mmoles of magnesium and 20 cc of a pH 10.2 buffer solution is agitated and maintained at a constant temperature of 22° C. After immersing the previously stabilized and calibrated electrode specific for magnesium, a zeolite sample is introduced (the zeolites used are indicated in the ensuing Table 4), corresponding to 1 g of anhydrous product. The data obtained are reported in Table 4.

TABLE 4

Mg²⁺ ION EXCHANGE KINETICS AT 24° C.
mg MgO per g zeolite

| TIME (sec) | A (1) | X (2) | A-LSX (3) | A-LSX (4) | MIX 75 (5) | MIX 80 (6) |
|---|---|---|---|---|---|---|
| 1 | 2 | 21 | 11 | 22 | 8 | 17 |
| 2 | 3 | 42 | 22 | 24 | 15 | 34 |
| 5 | 5 | 105 | 59 | 105 | 35 | 85 |
| 15 | 18 | 112 | 63 | 113 | 46 | 93 |

(1): Zeolite A;
(2): Zeolite X (Si/Al ratio 1.24);
(3): Zeolite A-LSX; A/LSX ratio 75/25 by XRD analysis (zeolite of Example 2);
(4): Zeolite A-LSX; A/LSX ratio 20/80 by XRD analysis (zeolite of Example 3);
(5): Mix 75 - physical mixture of zeolite A and zeolite X in 75/25 ratio;
(6): Mix 80 - physical mixture of zeolite A and zeolite X in 20/80 ratio.

We claim:

1. A microporous crystalline material named zeolite A-LSX having, in its anhydrous form, an oxides molar composition corresponding to formula (I):

$$(M_{2/n}O + M'_{2/n}O) \cdot Al_2O_3 \cdot zSiO_2 \qquad (I)$$

in which:
M and M', identical or different, represent a cation of an alkali or alkali earth metal of valency n;
z is a number between 2.1 and 2.6, extremes included, wherein the average particle diameter is between 0.9 μm and 10 μm, extremes included.

2. A microporous crystalline material as claimed in claim 1, wherein M and M', different from each other, represent an alkali metal.

3. A microporous crystalline material as claimed in claim 2, wherein M represents sodium and M' represents potassium.

4. A process for preparing the microporous crystalline material claimed in claim 1, comprising:
   a) preparing two aqueous solutions containing respectively:
      $Al_2O_3$ and $M_{2/n}O$ or $Al_2O_3$ and a mixture of $M_{2/n}O + M'_{2/n}O$;
      $SiO_2$ and $M_{2/n}O$ or $SiO_2$ and a mixture of $M_{2/n}O + M'_{2/n}O$;
   in which the quantity of reactants is such as to satisfy the following molar ratios:
      $SiO_2/Al_2O_3$ from 2.30 to 2.60, extremes included;
      $(M_{2/n}O + M'_{2/n}O)/SiO_2$ from 2.40 to 1.20, extremes included;
      $M_{2/n}O/(M_{2/n}O + M'_{2/n}O)$ from 0.91 to 1.00, extremes included;
      $H_2O/(M_{2/n}O + M'_{2/n}O)$ from 20 to 40, extremes included;
   b) bringing the two mixtures prepared in stage a) into contact at a temperature of between 20° C. and 70° C. for a time of between 1 minute and 30 minutes;
   c) aging the mixture obtained in stage b) at a temperature of between 60° C. and 70° C. for a time of between 30 minutes and 15 hours;
   d) crystallizing the mixture obtained in stage c) at a temperature of between 90° C. and 100° C. for a time of between 10 minutes and 120 minutes.

5. A process for preparing microporous crystalline material as claimed in claim 4, wherein the quantity of the reactants in stage a) is such as to satisfy the following molar ratios:
   $SiO_2/Al_2O_3$ from 2.40 to 2.55, extremes included;
   $(M_{2/n}O + M'_{2/n}O)/SiO_2$ from 1.70 to 1.25, extremes included;
   $M_{2/n}O/(M_{2/n}O + M'_{2/n}O)$ from 0.94 to 0.96, extremes included;
   $H_2O/(M_{2/n}O + M'_{2/n}O)$ from 22 to 33, extremes included.

6. A process as claimed in claim 4, wherein the aging stage c) is conducted for a time of between 2 hours and 8 hours.

7. A process as claimed in claim 4, wherein the crystallization stage d) is conducted for a time of between 30 minutes and 60 minutes.

8. A process as claimed in claim 4, wherein stage a) is conducted at a temperature of between 20° C. and 220° C.

9. A process as claimed in claim 4, wherein the aluminium source usable in stage a) is a sodium aluminate solution or a sodium and potassium aluminate solution.

10. A process as claimed in claim 4, wherein the silicon source usable in stage a) is a sodium silicate solution or a sodium and potassium silicate solution, in which the $SiO_2/Na_2O$ or $SiO_2/(Na_2O + K_2O)$ ratio is a whole or fractional number between 1 and 3, extremes included.

11. A process as claimed in claim 4, wherein the source of cations usable in stage a) is sodium hydroxide or a mixture of sodium and potassium hydroxides.

12. A process as claimed in claim 4, wherein M represents sodium and M' represents potassium, the reactants being mixed in stage b) at room temperature by adding together the aqueous solutions prepared in stage a) under agitation over a heel of water.

13. A process as claimed in claim 4, wherein during the aging stage c) the mass is left to stand, in the absence of agitation.

14. A process as claimed in claim 4, wherein the crystallization stage d) is conducted under static conditions or under agitation.

15. A process as claimed in claim 4, wherein M represents sodium and M' represents potassium, it being possible to form the reaction mixture of stage b) by adding under agitation to the sodium aluminate solution or sodium and potassium aluminate solution prepared in stage a), the sodium silicate or sodium and potassium silicate solution prepared in stage a), at a temperature such as to obtain an average resultant temperature of between 60° C. and 70° C., the subsequent stages c) and d) being conducted under the aforedescribed conditions.

16. A microporous crystalline material as claimed in claim 1, wherein the composition in terms of moles of oxide is as follows:
   $Na_2O$ from 0.9 to 0.99, extremes included;
   $K_2O$ from 0.1 to 0.01, extremes included;
   $Al_2O_3$ 1.00;
   $SiO_2$ from 2.10 to 2.30, extremes included; and a crystalline $H_2O$ content of between 21% and 24%, extremes included.

17. A microporous crystalline material as claimed in claim 1, wherein the average particle diameter is between 1.5 μm and 5 μm, extremes included.

18. A detergent composition containing the microporous crystalline material claimed in claim 1, either alone, or in the presence of other builders.

19. Detergent composition as claimed in claim 18, wherein the builder quantity present is between 20% and 80% by weight.

20. Detergent composition as claimed in claim 18, wherein the quantity of microporous crystalline material is between 20% and 50% by weight.

21. Detergent composition as claimed in claim 18, wherein the other builders are selected from the group consisting of zeolite A, polymer polycarboxylates, monomer polycarboxylates and inorganic salts.

22. Detergent composition as claimed in claim 18, containing one or more surfactants selected from the group consisting of anionic, cationic, nonionic, amphoteric and zwitterionic surfactants containing or not containing soap.

23. Detergent composition as claimed in claim 22, wherein the surfactants are selected from the group consisting of soap-containing anionic and nonionic surfactants, and synthetic anionic and nonionic surfactants not containing soap.

24. Detergent composition as claimed in claim 23, wherein the anionic surfactants are alkylbenzene sulphonates, primary and secondary alkyl sulphates, olefin sulphonates, alkane sulphonates, dialkyl sulphosuccinates, or sulphonated fatty acid esters.

25. Detergent compositions as claimed in claim 23, wherein the nonionic surfactants are ethoxylated primary and secondary alcohols, or alkylpolyglucosides.

26. Detergent composition as claimed in claim 18 containing bleaching agents, sodium silicate, fluorescent agents, anti-redeposition agents, inorganic salts, enzymes, foam control agents or foaming agents, pigments or perfumes.

27. Detergent composition as claimed in claim 18, in the form of powder, liquid, gel or solid bar.

28. Detergent composition as claimed in claim 18, containing a fabric washing component.

29. Detergent composition as claimed in claim 18, containing a dishwashing component.

* * * * *